United States Patent [19]

Hitt

[11] 4,236,430

[45] Dec. 2, 1980

[54] SWING-AWAY HOLD-DOWN CONSTRUCTION FOR BAR OR BILLET SHEAR

[75] Inventor: James A. Hitt, Lakeview, N.Y.

[73] Assignee: Buffalo Forge Company, Buffalo, N.Y.

[21] Appl. No.: 13,034

[22] Filed: Feb. 21, 1979

[51] Int. Cl.³ .................. B23D 33/02; B26D 7/02
[52] U.S. Cl. ................................ 83/461; 83/157; 83/452; 83/466; 83/467R
[58] Field of Search ............. 83/466, 453, 282, 157, 83/452, 563, 467, 461

[56] References Cited

U.S. PATENT DOCUMENTS

| 1,736,559 | 11/1929 | Vollrath | 83/452 |
| 3,170,351 | 2/1965 | Krynytzky | 83/452 X |
| 3,227,021 | 1/1966 | Judd | 83/157 X |
| 3,460,423 | 8/1969 | Hayashi | 83/563 X |
| 3,610,083 | 10/1971 | Yasuda et al. | 83/466 X |

Primary Examiner—Frank T. Yost
Attorney, Agent, or Firm—Joseph P. Gastel

[57] ABSTRACT

A hold-down construction for a shear used for shearing workpieces from an elongated metal member including an elongated beam having first and second ends and a central portion therebetween, a hold-down assembly mounted on the central portion, a pivotal connection between the first end of the beam and the post of a shear, and a detachable connection between the second end of the beam and another post of the shear, to thereby permit the hold-down to be swung toward and away from a knife assembly mounted on the shear, and a connection between the hold-down assembly and the knife assembly for reinforcing the hold-down assembly against movement away from the elongated metal member during shearing thereof.

9 Claims, 10 Drawing Figures

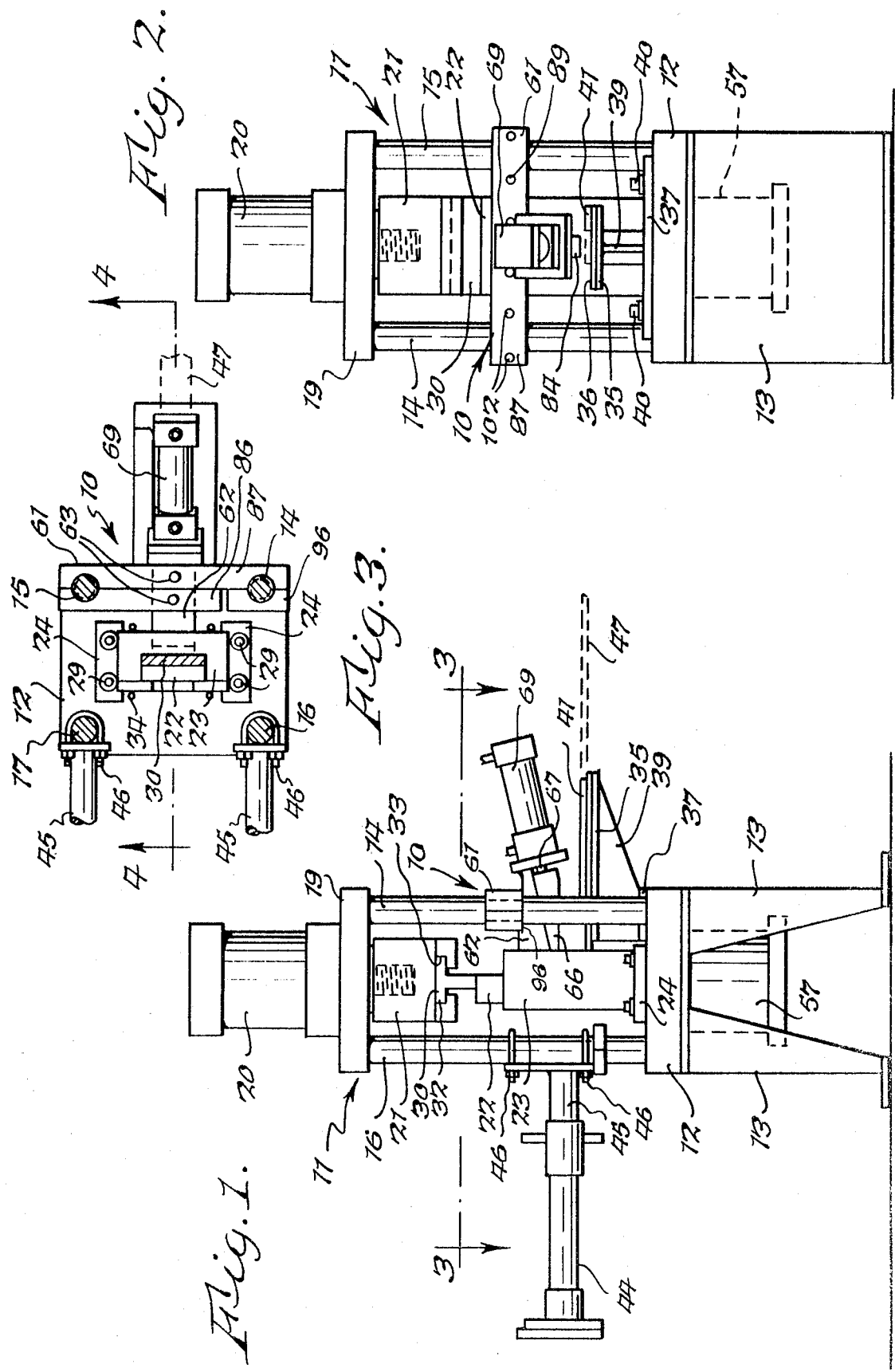

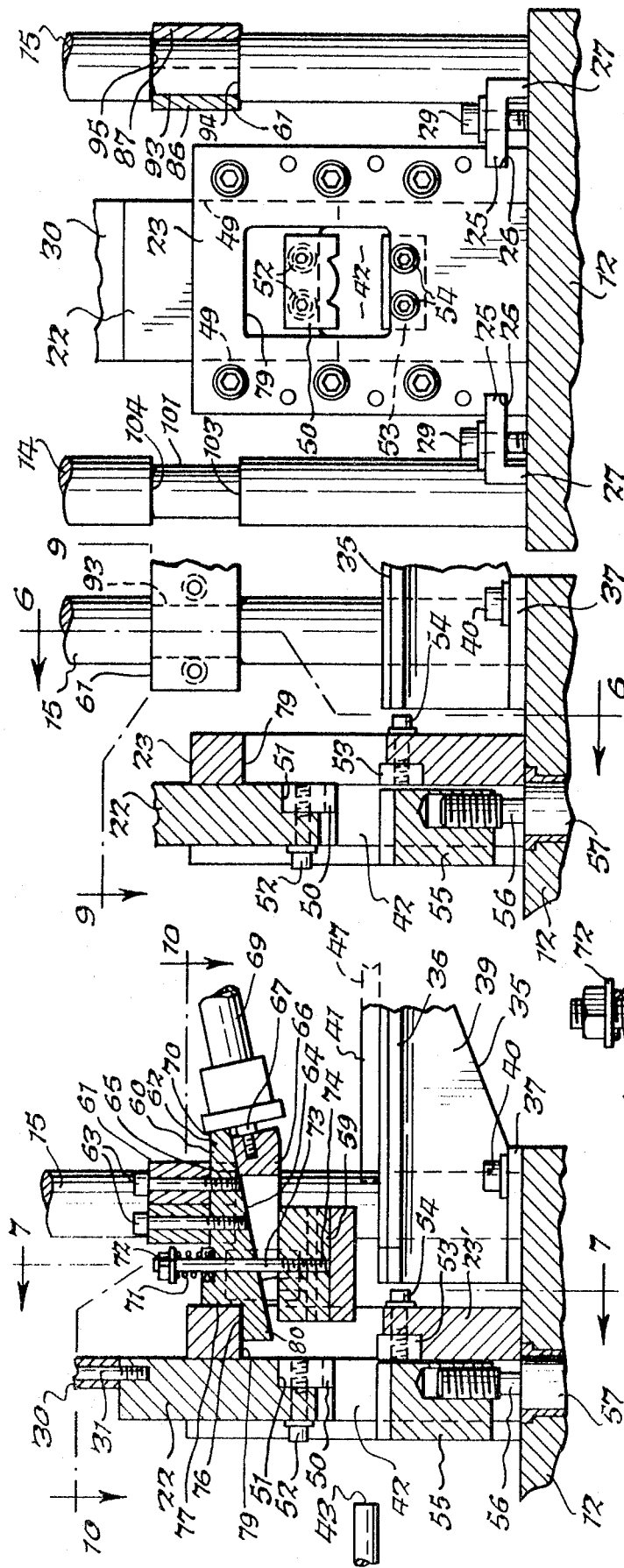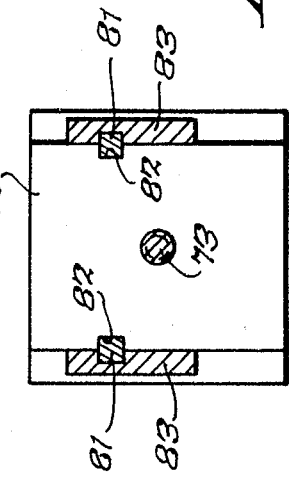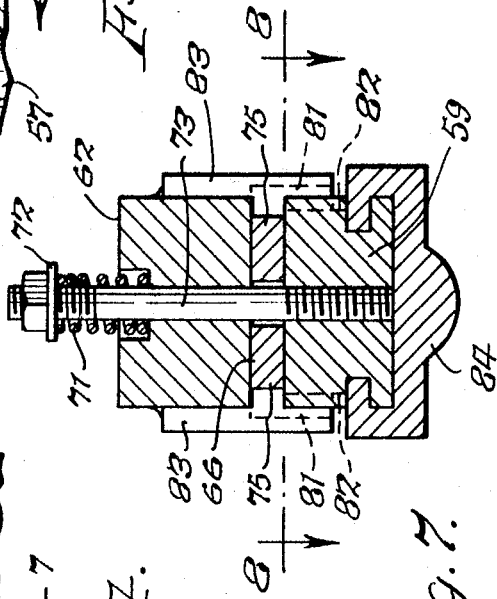

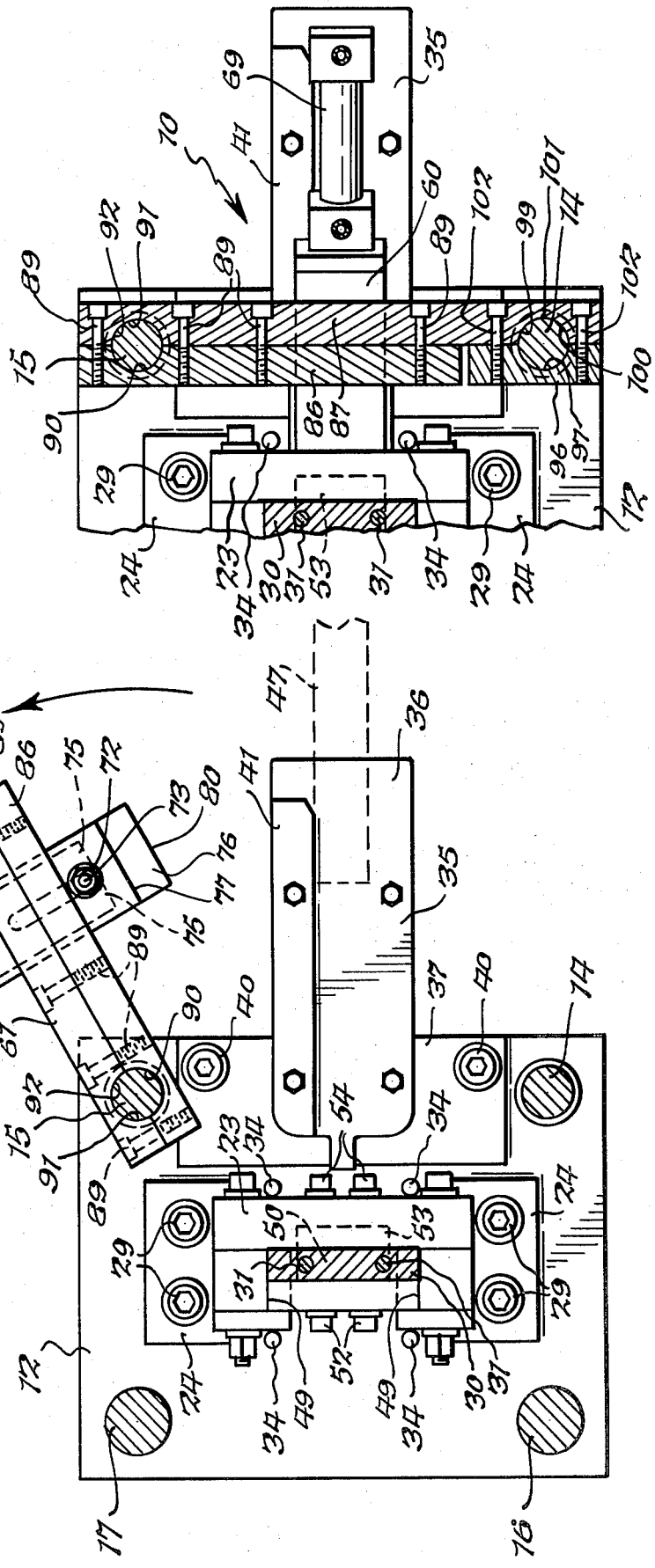

SWING-AWAY HOLD-DOWN CONSTRUCTION FOR BAR OR BILLET SHEAR

BACKGROUND OF THE INVENTION

The present invention relates to an improved hold-down assembly for a shear of the type used for shearing pieces from an elongated metal member.

By way of background, there are shears in existence known as bar or billet shears which shear pieces of metal from an elongated metallic member. Shears of this type are shown in U.S. Pat. No. 3,152,499 and No. 3,908,496. In both of the foregoing shears, the workpiece, that is, the portion of an elongated member which is to be sheared therefrom, is supported by a work support member while the portion of the elongated member adjacent thereto is held down by a hold-down member. Thereafter, the movable knife of the shear is caused to approach the fixed knife to sever the workpiece from the end of the elongated member. In machines of the foregoing type, the hold-down is mounted at the front of the machine. The rear end of the machine usually mounts a back gauge assembly against which the elongated member abuts so as to gauge the length of the workpiece to be sheared. In addition, at the rear of the machine there usually is a chute for guiding workpieces into a bin, which is also located at the rear of the machine.

In machines of the foregoing type, the fixed and movable knives have to be removed periodically for sharpening. In addition, when the knives are reinserted in the machine, they have to be adjusted for proper clearance. Furthermore, the knives must be inspected periodically and access to the area at which the knives are located must be had periodically. However, in the past, the replacement of knives from the rear of the machine was awkward and difficult in view of the fact that access was blocked by the back gauge, chute and bin, mentioned above. Furthermore, access from the front of the machine was blocked by the hold-down structure. As a result, replacement and adjustment of the knives was not only very difficult, because of the limited access, but was also very time-consuming and required that the machine be out of operation for a relatively long period of time. It is with overcoming the foregoing deficiencies in prior art shearing machines that the present invention is concerned.

SUMMARY OF THE INVENTION

It is accordingly one important object of the present invention to provide a swing-away hold-down assembly for a shearing machine which can be swung to an out-of-the-way position in an extremely simple and expedient manner to permit practically unlimited access to the knives for replacement or adjustment, as required, and which when in operative hold-down position, will provide firm, rigid hold-down to a workpiece as if it was permanently fixed in position.

Another object of the present invention is to provide an improved swing-away hold-down assembly which in hold-down position coacts with the tool assembly of the shear so that it is rigidized thereby, and which can be moved into operative engagement with the tool assembly merely by moving the hold-down assembly into position. Other objects and attendant advantages of the present invention will readily be perceived hereafter.

The present invention relates to a hold-down construction for a shear for shearing workpieces from an elongated metal member comprising an elongated beam having first and second ends and a central portion therebetween, first means on said first end for pivotally mounting said beam on a first portion of said shear, second means on said second end for selectively fastening said beam to a second portion of said shear, hold-down means for engaging said elongated member, and means for mounting said hold-down means on said central portion, whereby said elongated beam with said hold-down means thereon may be swung about said first portion when said second means is unfastened. The various aspects of the present invention will be more fully understood when the following portions of the specification are read in conjunction with the accompanying drawings wherein:

BRIEF DESCRIPTION OF THE DRAWINGS

FIG. 1 is a side elevational view of a shear mounting the swing-away hold-down construction of the present invention;

FIG. 2 is a view of the shear taken from the right of FIG. 1;

FIG. 3 is a fragmentary cross sectional view taken substantially along line 3—3 of FIG. 1 and showing the hold-down assembly mounted on the elongated beam support;

FIG. 4 is a fragmentary cross sectional view taken substantially along line 4—4 of FIG. 3 and showing the various details of the elongated beam, the hold-down assembly, and its relationship to the tooling assembly mounted on the shear;

FIG. 5 is a view similar to FIG. 4 but showing the hold-down swung out of position so that access may be had to the knives in the tool assembly;

FIG. 6 is a fragmentary cross sectional view taken substantially along line 6—6 of FIG. 5 and showing the unobstructed condition of the tool assembly when the hold-down is swung to its out-of-the-way position;

FIG. 7 is a cross sectional view taken substantially along line 7—7 of FIG. 4 and showing details of the mounting of the hold-down;

FIG. 8 is a cross sectional view taken substantially along line 8—8 of FIG. 7 and showing further details of the hold-down construction;

FIG. 9 is a cross sectional view taken substantially along line 9—9 of FIG. 5 and showing in plan the swing-away hold-down mounting construction swung to an open position; and FIG. 10 is a view similar to FIG. 9 and along line 10—10 of FIG. 4 but showing the hold-down swung into operating position.

DESCRIPTION OF THE PREFERRED EMBODIMENTS

The improved swing-away hold-down construction 10 of the present invention is shown mounted on shear 11, which is used for shearing workpieces from elongated metal members, which may be bars, billets or the like. Shear 11 includes a frame or base plate 12 mounted on pedestals 13. Four columns 14, 15, 16 and 17 extend upwardly from frame plate 12 and are secured, as by threading, to top plate 19 on which hydraulic cylinder 20 is mounted. A ram 21 is suitably attached to the piston of hydraulic cylinder 20 and is secured to the movable knife carrier 22 of tool assembly 23, which is attached to frame plate 12 by clamp members 24 (FIGS. 1, 3 and 6) having portions 25 received in slots 26 of tool assembly 23 and legs 27 which bear on the top of frame plate 12. Bolts 29 secure members 24 to frame plate 12. Movable knife carrier 22 is attached to T-shaped member 30 at its upper end by means of bolts 31 (FIG. 4) and the horizontal portion 32 of T-shaped member 30 is received in mating relationship in a longitudinal recess 33 in the bottom of ram 21. A plurality of dowels 34 extend upwardly from frame plate 12 and engage the sides of tool assembly 23 to locate it on frame plate 12. It can readily be seen that by removing fastening plates 24, the tool assembly 23 can be moved perpendicularly out of the plane of the drawing in FIG. 1, and this is permitted by the sliding connection between T-head 30 and its receiving slot 33 in ram 21.

A bar support member 35 is mounted on the front of the machine. In this respect, bar support member includes an upper table portion 36 connected to a lower flange portion 37 by means of web 39. Flange 37 in turn is secured to frame plate 12 by means of bolts 40. The elongated metallic member which is to be sheared, whether it is a bar, billet, or any other shape or form, is fed along the upper surface of table 36 and is guided by guide member 41. It is fed through the opening 42 (FIGS. 4 and 6) in the tool assembly 23 until it engages a suitable portion 43 (FIG. 4) of the back gauge assembly 44 (FIG. 1), the legs 45 of which (FIG. 3) are secured to posts 16 and 17 by means of U-bolts 46. Back gauge 44 may be of any conventional construction, and it is to be understood that when the elongated member 47 engages portion 43, the length of the workpiece to be sheared from the elongated member 47 is thus gauged.

As noted above, there is a movable knife carrier 22 mounted on tool assembly 23 and it is guided for vertical movement in ways 49. A movable knife 50 is secured in undercut portion 51 of movable knife holder 22 by means of bolts 52. The fixed knife 53 is secured by bolts 54 to the lower knife holder 23'. When the ram 21 is caused to move downwardly, the movable knife 50 will move downwardly toward the fixed knife 53 and will shear a workpiece from the end of member 47.

During shearing the workpiece is supported by a work support 55 mounted on rod 56 which is guided for vertical sliding movement in ways 49 toward work support cylinder 57 suitably secured to the underside of frame plate 12. The ultimate objective is to maintain the axis of the piece being sheared from elongated member 47 substantially parallel to the axis of elongated member 47 during shearing to obtain an optimum cut. Work support cylinder 57 may contain a compressible member, such as polyurethane of the required density, to provide resilient resistance to the workpiece during the shearing operation, or work support cylinder 57 may be hydraulic to provide the required force to work support 55 to cause it to maintain the axis of the workpiece substantially parallel to the remainder of elongated member 47. If cylinder 57 contains polyurethane, suitable structure is provided to prestress it so that the work support force can be varied for different materials. It will be appreciated that after the shearing operation, work support 55 will rise back to the position shown in FIG. 4, but that during the shearing operation, it will move downwardly.

As noted briefly above, during the shearing operation the elongated member 47 is held down by hold-down block 59 which forms part of the hold-down assembly 60. The hold-down assembly is mounted on elongated beam or hold-down support member 61, the opposite ends of which are mounted on columns 14 and 15 during shearing, as shown in FIG. 10 but which can be swung to an out-of-the-way position as shown in FIG. 9 when it is required to change the knives, adjust their clearance, or obtain access to the tool assembly from the feed guide side of the shear for any other purpose.

The hold-down assembly includes a mounting block 62 which is secured to the underside of elongated support member 61 by means of bolts 63 (FIG. 4). Support block 62 has an inclined undersurface 64 against which upper surface 65 of wedge 66 slides. Wedge 66 is attached to the piston 67 of hold-down cylinder 69 which is hydraulically actuated. Hydraulic cylinder 69 is attached, as by welding at 70, to block 62. It can therefore be seen that when hydraulic cylinder 69 is actuated, wedge 66 will move to the left in FIG. 4 and will cause clamping block 59 to move downwardly into engagement with member 47 against the bias of spring 71 which is located between the top of block 62 and washer 72 mounted on bolt 73, the lower end 74 of which is threaded into hold-down block 59. It will be appreciated that bolt 73 slides in a mating bore in block 62. When the hydraulic cylinder 69 is deactuated to cause wedge 66 to move to the right in FIG. 4, spring 71 will raise hold-down block 59. It will be appreciated that in order to accommodate bolt 73, wedge 66 is formed into bifurcated ends 75 at its thinner end.

To aid in rigidizing the hold-down assembly during the time that it engages the elongated member 47, the left end of work support block 62 is formed as shown in FIGS. 4 and 9 with a horizontal shelf portion 76 which merges into a vertical wall portion 77. Horizontal shelf portion 76 slides under planar surface 79 of tool assembly 23. Thus, the left end portion 80 of block 62 is supported against upward movement because of the very close clearance between surfaces 76 and 79, such clearance being on the order of about one thousandth of an inch. If desired, a bolt can be passed downwardly through the tool assembly housing into block portion 80 to lock them together. Furthermore, the remainder of block 62 is supported against upward movement because of its connection with the undersurface of elongated beam 61.

At this point it is to be noted that hold-down block 59 is guided for vertical movement relative to block 62 by keys 81 received in mating keyways 82 in hold-down block 59, keys 81 being supported by brackets 83 which are welded to the opposite sides of block 62 (FIG. 7). The underside of block 59 carries a work supporting member 84 which is of any suitable configuration to properly mate the contour of the elongated member 47 which is being sheared.

As noted briefly above, in accordance with the present invention, access must be had periodically to the tool assembly 23 for the purpose of removing the lower knife 53 and the upper knife 50 and for the further purpose of setting the clearance between knives and for other reasons, such as inspection of the knives. Previously, with the hold-down assembly fixed, this was an extremely difficult task because the hold-down assembly restricted access to the knives. Therefore, the clearest access was through the rear of the machine where the back gauge assembly 44 was mounted. However, the back gauge assembly also obstructed access to the knives 50 and 53, and in addition, there usually was a workpiece receiving bin located at the rear of the machine which also restricted access.

By movably mounting the hold-down assembly to swing away from the position of FIG. 10 to the position of FIG. 9, clear access can be had to knives 50 and 53 for replacement, repair and adjustment of their clearances. Thus, after the hold-down assembly has been swung to the position of FIG. 9, all that is necessary to remove lower knife 53 from tool assembly 23 is to loosen bolts 54 and lift knife 53 out of lower knife holder 23'. To remove upper knife 50, all that is necessary is to loosen bolts 52 from the rear of the machine and remove movable knife 50 from the front of the machine. The clearances between knives 50 and 53 can be adjusted by the use of suitable shims and access for such adjustment is very easily obtainable from the front of the machine when the work support assembly is swung to the out-of-the-way position shown in FIG. 9.

In order to achieve the swing-away feature without any sacrifice in rigidity, an elongated hold-down support beam 61 is provided. Beam 61 is preferably made in two sections, 86 and 87 (FIG. 9), which are secured to each other by a plurality of bolts 89. At one end of bar 61 member 86 has a semicylindrical cutaway 90 which is located in opposition to a semicylindrical cutaway 91 in member 87 so that when members 86 and 87 are assembled, as shown in FIG. 9, cutaways 90 and 91 will define a cylindrical bore 92. The diameter of bore 92 is only slightly larger than the diameter of reduced portion 93 (FIG. 6) of post 15. Thus, when members 86 and 87 are assembled, beam 61 can swing about reduced diameter portion 93 and it will be held against sliding downwardly on post 15 by lower shoulder 94. In addition, upper shoulder 95 rigidly holds beam 61 from moving upwardly during a hold-down operation.

In order to secure beam 61 in the position shown in FIG. 10, a retaining block 96 is provided having a semicylindrical cutout 97 therein which is adapted to lie in opposition to semicylindrical cutout 99 in member 87 which is adjacent to post 14. Cutouts 97 and 99 define a cylindrical bore 100 which receives reduced portion 101 of post 14 in mating relationship. Block 96 is secured in position relative to member 87 by bolts 102. A lower shoulder 103 on post 14 holds beam 61 from moving downwardly and an upper annular shoulder 104 on post 14 holds beam 61 from being forced upwardly during a hold-down operation.

It will readily be appreciated that whenever it is desired to swing beam 61 from the position shown in FIG. 10 to the position shown in FIG. 9, all that is necessary is to remove bolts 102 so as to permit disassembly of block 96, and thereafter beam 61 can be swung to the position shown in FIG. 9. To return beam 61 to the position shown in FIG. 10 and attach it securely to post 14, all that need be done is to swing beam 61 clockwise about post 15 from the position shown in FIG. 9 to the position shown in FIG. 10 wherein semicylindrical cutout 99 receives reduced portion 101, and thereafter attach block 96 to member 87 by means of bolts 102.

It will readily be appreciated that the improved swing-away hold-down assembly of the present invention is manifestly capable of achieving the above enumerated objects, and while a preferred embodiment has been disclosed, it will be appreciated that the present invention is not limited thereto but may be otherwise embodied within the scope of the following claims inasmuch as there are other ways of movably securing the beam 61 relative to the remainder of the shear.

What is claimed is:

1. A hold-down construction for a shear for shearing workpieces from an elongated metal member, said shear having first and second spaced vertical posts, comprising an elongated beam having first and second ends and a central portion therebetween, first means on said first end for pivotally mounting said beam on said first post of said shear, second means on said second end for selectively fastening said beam to said second post of said shear, hold-down means for engaging said elongated member, and means for mounting said hold-down means on said central portion, whereby said elongated beam with said hold-down means thereon may be swung about said first post when said second means is unfastened.

2. A hold-down construction as set forth in claim 1 including means for preventing said beam from moving upwardly on said posts during a shearing operation.

3. A hold-down construction for a shear for shearing workpieces from an elongated metal member, said shear including first and second spaced vertical posts, comprising an elongated beam having first and second ends and a central portion therebetween, first means on said first end for pivotally mounting said beam on said first post, second means on said second end for selectively fastening said beam to said second post, hold-down means for engaging said elongated member, and means for mounting said hold-down means on said central portion, whereby said elongated beam with said hold-down means thereon may be swung about said first post when said second means is unfastened, said first means comprising a cylindrical bore for receiving a portion of said first post of said shear, and said second means comprising a block which is movable relative to an adjacent portion of said beam and which coacts therewith to clamp said second post of said shear therebetween.

4. A hold-down construction as set forth in claim 3 for a shear which includes a tool assembly, including an end on said hold-down means for locking engagement with said tool assembly of said shear when said elongated beam is supported by said first and second posts.

5. A hold-down construction for a shear for shearing workpieces from an elongated metal member comprising an elongated beam having first and second ends and a central portion therebetween, first means on said first end for pivotally mounting said beam on a first portion of said shear, second means on said second end for selectively fastening said beam to a second portion of said shear, hold-down means for engaging said elongated member, means for mounting said hold-down means on said central portion, whereby said elongated beam with said hold-down means thereon may be swung about said first portion when said second means is unfastened, said first portion of said shear comprising a first post on said shear, a first reduced size portion on said first post, a first bore on said first end of said elongated beam for receiving said first reduced size portion in mating relationship, said second portion of said shear comprising a second post on said shear, a second reduced size portion on said second post, said elongated beam including a block which is separable from the remainder thereof and coacts therewith to define a second bore at said second end for receiving said second reduced size portion in mating relationship, and fastening means for fastening said block to said remainder of said beam in clamping relationship with said second reduced size portion.

6. A hold-down construction for a shear for shearing workpieces from an elongated metal member comprising an elongated beam having first and second ends and a central portion therebetween, first means on said first end for pivotally mounting said beam on a first portion of said shear, second means on said second end for selectively fastening said beam to a second portion of said shear, hold-down means for engaging said elongated member, means for mounting said hold-down means on said central portion, whereby said elongated beam with said hold-down means thereon may be swung about said first portion when said second means is unfastened, said first and second portions of said shear comprising first and second spaced posts, respectively, first downwardly facing shoulder means on said first post for engaging said beam proximate said first end, and second downwardly facing shoulder means on said second post for engaging said beam proximate said second end.

7. A hold-down construction for shearing workpieces from an elongated metal member comprising a hold-down support member, a hold-down assembly mounted on said hold-down support member, means on said hold-down assembly for engaging a tool assembly secured to said shear to reinforce said hold-down assembly against movement away from a workpiece during a shearing operation, and means for mounting said hold-down support member on said shear for selectively moving said hold-down assembly into and out of engagement with said tool assembly, said hold-down support member comprising an elongated beam having first and second ends and a central portion therebetween, and said hold-down assembly being mounted on said central portion, and said shear including first and second spaced vertical posts, and said means for mounting said hold-down support member on said shear comprising a pivotal connection between said first end of said beam and said first post and a selectively fastenable connection between said second end of said beam and said second post for permitting horizontal swinging movement of said beam.

8. A hold-down construction as set forth in claim 7 wherein said means on said hold-down assembly for engaging a tool assembly comprises an upper surface on said tool assembly for abuttingly engaging a lower surface on said hold-down assembly which moves into abutting engagement with said upper surface during said horizontal swinging movement of said beam.

9. A hold-down construction as set forth in claim 8 wherein said hold-down assembly is secured to the underside of said beam.

* * * * *